United States Patent [19]
Imoto

[11] Patent Number: 4,771,283
[45] Date of Patent: Sep. 13, 1988

[54] REMOTE CONTROL DEVICE

[75] Inventor: Shin'ichi Imoto, Iwaki, Japan

[73] Assignee: Alpine Electronics Inc., Japan

[21] Appl. No.: 819,913

[22] Filed: Jan. 16, 1986

[30] Foreign Application Priority Data

Jan. 16, 1985 [JP] Japan .............................. 60-3755[U]

[51] Int. Cl.$^4$ ...................... G08L 19/00; H04B 9/00; H04B 1/06
[52] U.S. Cl. .......................... 340/825.71; 340/825.72; 340/825.73; 455/603; 455/352; 358/194.1
[58] Field of Search ...................... 340/825.69, 825.72, 340/825.73, 825.76, 825.71; 358/194.1; 455/601, 603, 608, 352, 151, 152

[56] References Cited

U.S. PATENT DOCUMENTS 4,488,179 12/1984 Krüger et al. .............. 358/194.1
4,623,887 11/1986 Welles, II .................. 340/825.69
4,633,514 12/1986 Fimoff et al. ............... 358/194.1

Primary Examiner—Robert L. Griffin
Assistant Examiner—Ralph E. Smith
Attorney, Agent, or Firm—Guy W. Shoup; Leighton K. Chong; Paul J. Winters

[57] ABSTRACT

A common remote control device has an operating section for specifying an equipment to be remote-controlled and an operation of the equipment; a memory; a receiving unit for receiving various remote control signals generated from each of the private remote control transmitters provided corresponding to the equipment; a control unit for storing the remote control signals corresponding to each operation of the equipment as digital data in the memory, and retrieving the data from the memory to generate same; and a regeneration unit for regenerating the remote control data generated from the control unit and supplying a regenerative remote control signal to the equipment specified by the operating section. All of the equipment may be remote-controlled by a single remote control transmitter used to access the remote control device.

3 Claims, 3 Drawing Sheets

REMOTE CONTROL DEVICE

BACKGROUND OF THE INVENTION (1) Field of the Invention

This invention relates to a remote control device, and more particularly to a remote control device which may be remote-controlled by a single operating means (e.g., remote control transmitter) commonly provided for a plurality of equipments to be remote-controlled.

(2) Description of the Prior Art

A conventional AV (audio visual) equipment such as a television (TV), video tape recorder (VTR), video cassette recorder (VCR), compact disc (CD), video disc and audio cassette is provided with a private wireless transmitter (remote control transmitter) for every equipment, and a desired equipment is designed to be remote-controlled by operating a respective private remote control transmitter.

However, in a conventional method where the remote control transmitter is selectively used according to the equipment to be remote-controlled, there is a problem that operation is different for every equipment, and a predetermined remote control transmitter must be searched for, which makes the remote control device troublesome to use and operate. Further, there is a difficulty in locating and carrying of each remote control transmitter, thereby causing a problem in maintenance of the remote control transmitters.

SUMMARY OF THE INVENTION

It is a primary object of the present invention to provide a remote control device which may be remote-controlled by a single operating means (e.g., remote control transmitter) commonly provided for a plurality of equipments to be remote-controlled.

It is another object of the present invention to provide a remote control device which is easy to use and is convenient to place and carry.

The remote control device according to the present invention comprises an operating means, commonly provided for a plurality of equipments to be remote-controlled, for specifying an equipment to be remote-controlled and operation of the equipment; a memory; a receiving unit for receiving various remote control signals generated from remote control transmitters provided for the equipments; a control unit for storing the remote control signals corresponding to each operation of the equipments as digital remote control data in the memory and reading the remote control data corresponding to the equipment and the operation as specified by the operating means from the memory to generate the same; and a regeneration unit for regenerating the remote control data generated from the control unit and supplying a regenerative remote control data to the equipment specified by the operating means.

In operation, the remote control device is set to a registration mode, and each remote control transmitter provided corresponding to each equipment is operated in this mode. Remote control signals generated by operation of the remote control transmitters are received by a receiving unit of the remote control device, and is then demodulated to be fed to a control unit. The control unit serves to register the respective remote control signals for each operation of the equipments. That is to say, the remote control signals corresponding to all the operations of all the equipments are stored in a RAM.

When used, the remote control device is set to a remote control mode, and an operating means such as a remote control transmitter commonly provided for all the equipments is operated with the remote control device in this mode to specify an equipment and operation to be effected by the equipment.

The control unit serves to identify the equipment and the operation as specified by the operating means, and read a remote control signal (digital data) corresponding to the identified equipment and operation from the RAM to generate the same. The regeneration unit serves to convert the digital data generated from the control unit to a bit serial pulse train and modulate a carrier with the pulse train to regenerate the remote control signal, then supplying the remote control signal to the specified equipment. In this case, the remote control signal as regenerated by the regeneration unit is identical with the remote control signal from the remote control transmitter corresponding to each of the equipments. Accordingly, the equipment receiving the remote control signal from the regeneration unit is operated in the same manner as with the case that it is directly controlled by the private remote control transmitter for the equipment.

Other objects and features of the invention will be more fully understood from the following detailed description and appended claims when taken with the accompaning drawings.

DETAILED DESCRIPTION OF THE PREFERRED EMBODIMENT

Figure 1:
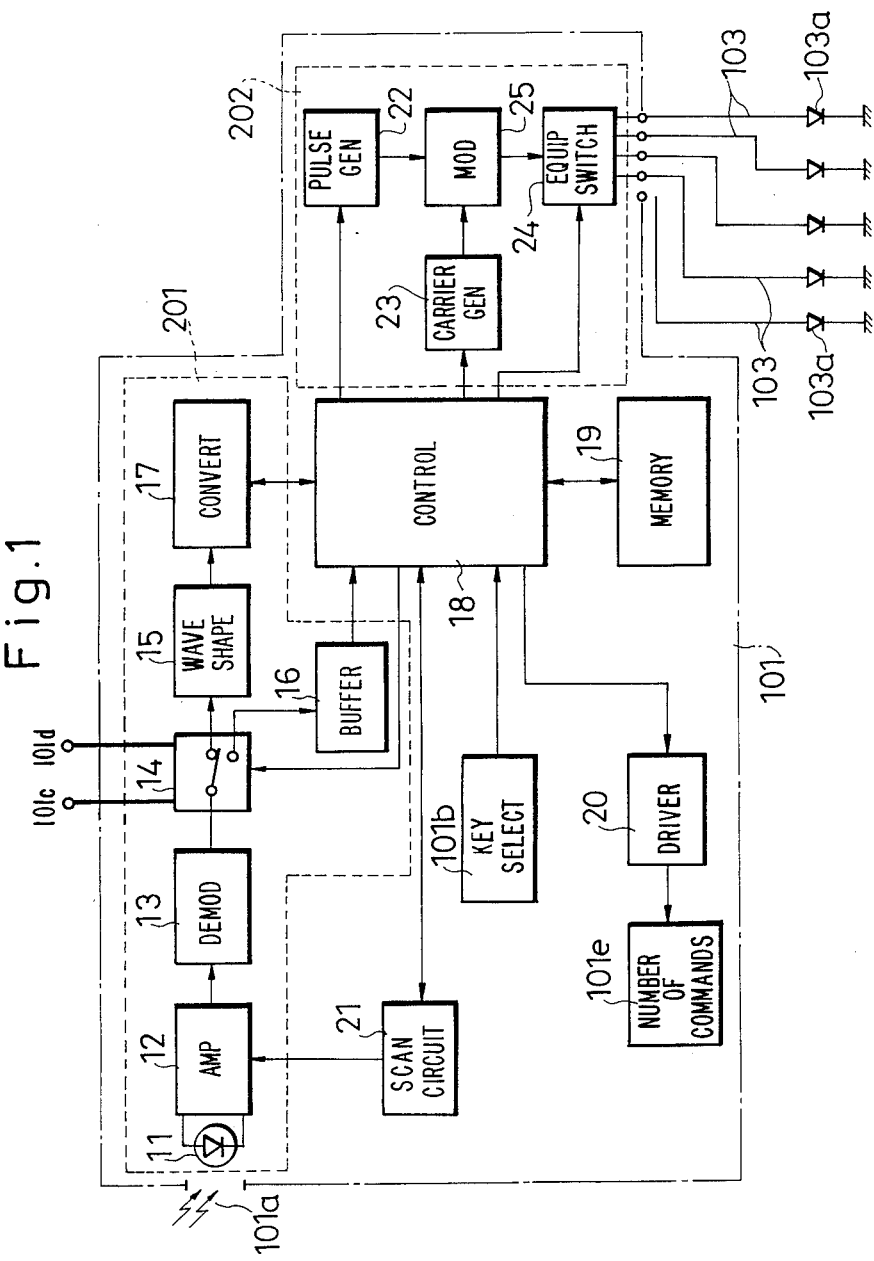
FIG. 1 is a block diagram of a body of the remote control device according to the present invention.
Figure 2:
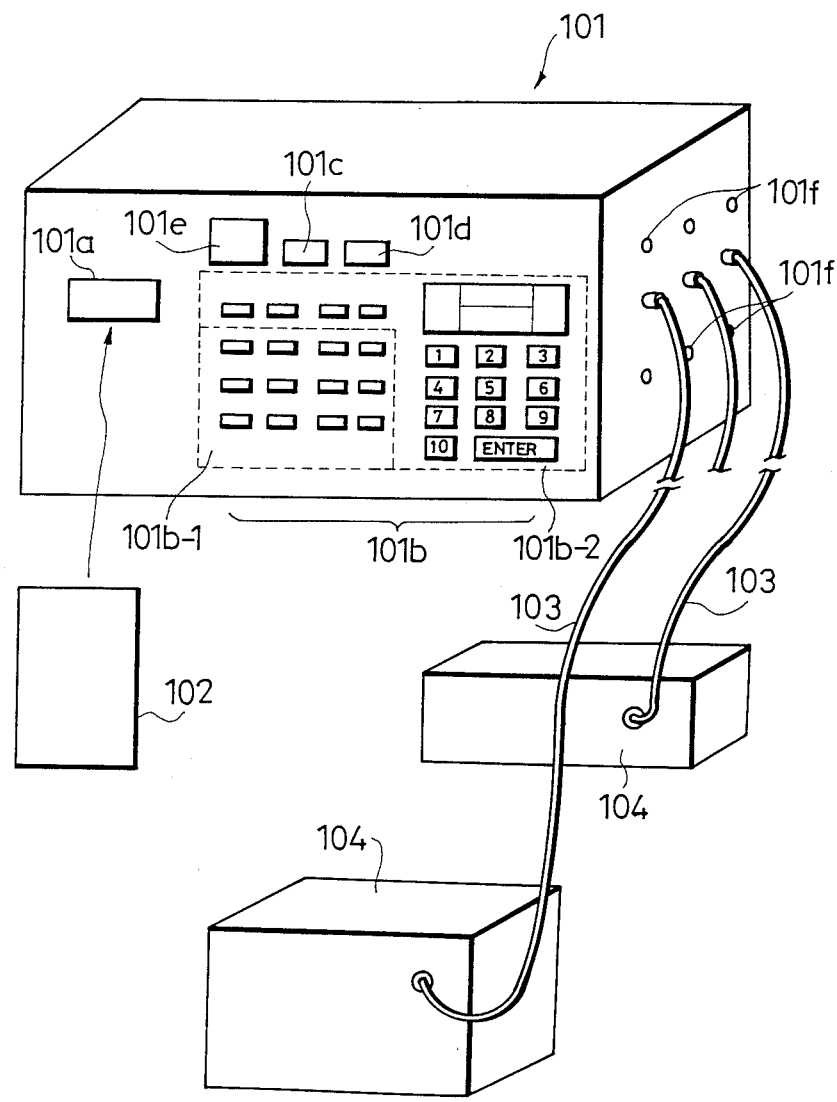
FIG. 2 is a schematic perspective view of the remote control device.

FIG. 1 shows a block diagram of a body of the remote control device according to the present invention, and FIG. 2 shows a schematic perspective view of the remote control device.

Referring to FIG. 2, there are provided on a front panel of a body 101 of the remote control device an infrared ray receiving section 101a for receiving a remote control signal from a remote control transmitter 102, an operating section 101b, a registering key 101c for selecting the mode for registering remote control signals generated from respective private remote control transmitters corresponding to AV equipments to digital data to be stored in a RAM incorporated in the body (this condition will be referred to as a registration mode), a remote control key 101d for selecting the mode for regenerating the remote control signals (this condition will be referred to as a remote control mode), and an indicator section 101e for indicating the residual number of command which may be registered (how many residual commands may be registered in the RAM).

The operating section 101b includes an equipment selecting section 101b-1 for selecting an AV equipment to be controlled and an operation selecting section 101b-2 for specifying a particular operation of the equipment as selected. The equipment selecting section 101b-1 is provided with respective keys corresponding to each of the AV equipments, and the operation selecting section 101b-2 is provided with respective function keys corresponding to each operation. That is to say, the equipment selecting section 101b-1 is provided with a key corresponding to each equipment, i.e. CATV 1 (cable antenna television), CATV 2, TV (television), AUXTV (auxiliary TV), VCR 1 (video cassette recorder), VCR 2, VTR, CD (compact disc), FM radio, and audio cassette, etc. On the other hand, the operation selecting section 101b-2 is provided with a system on/off key, volume up key, volume down key, mute key, pause/still key, play key, stop key, tuning up/review key, tuning down/cue key, numerical keys and enter key for data input, etc.

External output terminals 101f corresponding to each of the equipments are provided on a side surface of the body 101, and the body 101 is connected through the external output terminals 101f to predetermined equipments 104 by connection cables 103.

Next, a remote control operation of the remote control device according to the present invention will be described with reference to FIGS. 1 and 2.

(A) Registering Operation

A registering operation is conducted for registering the remote control signals corresponding to each operation of each equipment in a battery back-up RAM (nonvolatile memory such as magnetic bubble memory) incorporated in the body 101. That is, the following steps are conducted.

(1) First, the registering key 101c (See FIG. 2) is pushed to effect the registration mode.

(2) Next, the AV equipment corresponding to the remote control transmitter whose remote control signal will be now registered is specified by operation of the corresponding key of the equipment selecting section 101b-1, and at the same time, the operation corresponding to the remote control signal to be registered is specified by key operation of the operation selecting section 101b-2.

Figure 3:
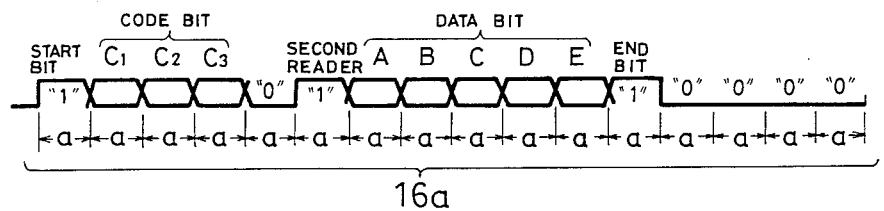
FIG. 3 is an illustration of a remote control signal.

(3) Then, in the function keys provided on the private remote control transmitter for the specified equipment, the function key corresponding to the specified operation is pushed to generate a remote control signal. As shown in FIG. 3, the remote control signal is fundamentally constituted of 16 bits serial data for example (time between each bit is about 2.3 m sec), and during continuous push of the key, a 2-cycle fundamental waveform is cyclically generated and made still. The remote control signal is obtained by pulse modulation of a carrier having a predetermined frequency with the above-mentioned serial data.

(4) The remote control signal generated from the private remote control transmitter with an infrared ray is received by a light receiving element (photo diode) 11 in the body 101, and is amplified by a light receiving amplifier 12, then demodulated by a demodulation circuit 13 in the next step. The remote control signal separated from a carrier in the demodulation circuit 13 is fed through a switching circuit 14 to a waveform shaping circuit 15. The switching circuit 14 supplies the remote control signal to the waveform shaping circuit 15 in the registration mode, while it supplies the remote control signal to a buffer 16 in the remote control mode. Then, the remote control signal after being waveform-shaped is fed to a converter section 17 where the signal is converted to digital data. That is to say, the converter section 17 divides the remote control signal at a predetermined period and a predetermined level to generate digital bit serial data. Then, the bit serial data is stored in a shift register which is capable of serial writing/parallel reading, and the data is outputted from the shift register in a parallel manner thereby to convert the remote control signal to digital parallel data. A receiving section 201 is constituted of the above-mentioned elements 11 to 17.

(5) The parallel data converted by the converter section 17 is read by a control section 18, and is stored in a memory area of a RAM 19 corresponding to the equipment and the operation as specified in the above-mentioned step (2). Thusly, registration of the remote control signal (command) corresponding to one operation is completed.

(6) Then, the next operation is selected by key operation of the operation selecting section 101b-2, and thereafter the function key of the private remote transmitter corresponding to the selected operation is pushed. Subsequently, similar processing as in the steps (4) and (5) is conducted.

(7) After the above-mentioned registering operation for one equipment is completed, a similar operation is conducted for the next equipment, and finally the registering operation for all the equipments is completed.

The number of commands which may be registered in the RAM 19 is limited for each equipment, and therefore after the equipment is specified in the registration mode, the control section 18 serves to count a residual registerable number of commands for the equipment, which is indicated on the indicator section 101e via an indication driver 20, and update the residual number of command every time one command is registered.

A carrier frequency of the private remote control transmitter is in the range of 38 KHz±3-5 KHz, but the carrier frequency is different for different manufacturers of the equipment. To this end, a tuning frequency of the light receiving amplifier 12 is required to be selected so that it may coincide with the carrier frequency of the remote control transmitter. In the present invention, there is provided a frequency scan circuit 21. Selecting the registering mode by key 101c causes the control section 18 to issue a scan instruction to scan circuit 21 for detection of the carrier frequency of the private remote control transmitter. Namely, the tuning frequency of the light receiving amplifier 12 is scanned every 1 KHz from 33 KHz to 43 KHz control of the frequency scan circuit 21, and when the remote control signal is detected in coincidence with the scanned frequency, the scanning is stopped, thereafter the stopped frequency is identified, and the control unit 18 executes storing the remote control signal and the carrier frequency in the RAM.

(B) Remote Control Operation

Figure 4:
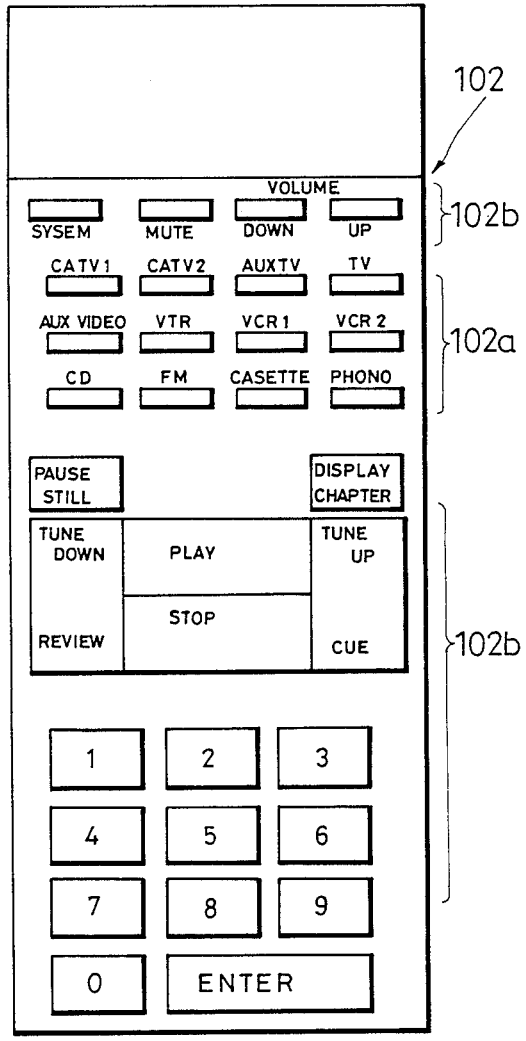
FIG. 4 is a schematic plan view of a remote control transmitter.

There will now be described a remote control operation. Remote control operation includes a method effected by key operation of the operating section 101b on body 101, or by another method employing a common remote control transmitter (FIG. 4) commonly provided for all the equipments. The following description is adapted to the latter method employing the remote control transmitter.

(1) First, the remote control key 101d (FIG. 2) is operated to obtain a remote control mode.

(2) Then, a function key provided on a common remote control transmitter 102 (FIG. 4) is operated to specify an equipment and operation to be conducted by the equipment. The remote control transmitter 102 includes keys identical with the keys of the operating section 101b of the body 101. Accordingly, the remote control transmitter 102 includes an equipment selecting section 102a and an operation selecting section 102b.

(3) When the function key is pushed, a remote control signal is generated from the remote control transmitter 102 with an infrared ray, and is received by the light receiving element 11. Then, the remote control signal is amplified by the light receiving amplifier 12, and thereafter is separated from a carrier by the demodulation circuit 13 to supply a bit serial remote control signal through the switching circuit 14 to the buffer 16 and convert the same to digital parallel data.

(4) The parallel data stored in the buffer 16 is read by the control section 18, and the equipment and the operation as specified by the remote control transmitter 102 is identified.

(5) After identification of the equipment and the operation, the control section 18 reads the registered remote control data from the memory area of the RAM 19 corresponding to the equipment and the operation to supply the remote control data to a pulse generator 22 and simultaneously supply a carrier frequency data read from the the RAM 19 to a carrier generator 23. At the same time, the control section 18 supplies a code for the equipment as identified to an equipment switching circuit 24.

(6) The pulse generator 22 converts the inputted parallel remote control data to a bit serial pulse train having a bit time of 2.3 m sec, and applies the pulse train to a modulator 25.

On the other hand, the carrier generator 23 generates a carrier having a frequency indicated by the inputted frequency data provided by control section 18.

(7) The modulator 25 acts to modulate the carrier with the pulse train as inputted from the pulse generator 22, and to regenerate a remote control signal. A regeneration unit 202 is constituted of the elements 22 to 25. The remote control signal to be generated from the modulator 25 is identical with the remote control signal to be generated from the private remote control transmitter.

(8) The remote control signal generated from the modulator 25 is applied to the equipment switching circuit 24 which in turn supplies the remote control signal to a predetermined equipment. In other words, the equipment switching circuit 24 supplies the remote control signal to the connection cable 103 connected to the equipment specified by the control section 18.

(9) Each of the connection cables 103 is provided with a light emitting element 103a at an end on the equipment side, and an infrared ray generated from the light emitting element is received by a light receiving element (not shown) which is provided on the equipment. Accordingly, when the remote control signal is applied to a predetermined connection cable 103, a light signal is generated from the light emitting element, and is received by the light receiving element of the equipment. After this time, the equipment is operated in the same manner as with the remote control signal from the private remote control transmitter. Each end of the connection cables is mounted to the equipment by means of a connector or the like.

Although the remote control operation is effected by the common remote control transmitter in the above-mentioned embodiment, it may be similarly effected by the key operation of the operating secton 101b.

Further, in substitution for use of the frequency scan circuit, the tuning frequency of the light receiving amplifier 12 may be fixed to 38 KHz and the carrier frequency of the carrier generator 23 may be also fixed to 38 KHz. This is the reason why the carrier frequency in the remote control transmitter is mostly 38 KHz, and is in the range of about 38 KHz±3-5 KHz. Therefore, different carrier frequencies may be demodulated in the light receiving amplifier only by setting the center of the tuning frequency of the light receiving amplifier 12 to 38 KHz and making the bandwidth wide.

Moreover, although the body 101 of the remote control device is separated from the remote control transmitter 102, and the body is connected through the connection cables to the equipments 104 in the above-mentioned embodiment, the remote control transmitter may be integrally combined with the body, and each of the equipments may be remote-controlled by an infrared ray in substitution for the provision of the connection cables.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A remote control device for operating in common any one of a plurality of remote-controllable equipments, each of which is provided with a respective private remote control transmitter capable of emitting remote control signals to control selected operations of the associated equipment, comprising:

a common remote control transmitter having a remote operating section including a plurality of keys for selecting any one of the plurality of equipments and any one of the operations to be performed by each equipment;

a common body unit having a control panel, a body operating section including a plurality of keys on the control panel for selecting any one of the plurality of equipments and any one of the operation to be performed by each equipment, first means for selecting a registering mode, receiving means for receiving a remote control signal emitted by a private remote control transmitter and converting it into corresponding digital data, and a memory for storing the digital data converted by said receiving means;

said common body unit including a control unit having means responsive to selection of an equipment and an operation of the equipment on said body operating section of said body unit, to said first means selecting the registering mode, and to said receiving means receiving a remote control signal of a private remote control transmitter and converting it into digital data, for storing the digital data in said memory corresponding to the selected equipment and selected operation;

said common body unit further including second means for selecting a regeneration mode, regeneration means for regenerating a remote control signal of a private remote control transmitter from corresponding digital data, and output means connecting said body unit to the plurality of equipments for providing an output remote control signal to any selected one of said plurality of equipments from said body unit; and said control unit further having means repsonsive to selection of an equipment and an operation of the equipment on said remote operating section of said common remote control transmitter, and to said second means selecting the regeneration mode, for retrieving the stored digital data in said memory corresponding to the selected equipment and selected operation, for controlling regeneration of the corresponding remote control signal from the digital data, and for controlling the output of the regenerated remote control signal by said output means to the selected equipment, whereby any selected one of the plurality of equipments can be operated by said common remote control transmitter in conjunction with said common body unit, instead of by the respective private remote control transmitters operated individually with each separate one of the plurality of equipments, wherein said body unit further comprises command counting means operable in conjunction with said remote operating section and said control unit for counting and displaying a number of registrable remote control signals available to a selected equipment.

2. The remote control device as defined in claim 1 and said body unit further comprising a frequency scan circuit for allowing a tuning frequency of a light receiving amplifier to identify a carrier frequency of each private remote control transmitter.

3. A remote control device according to claim 1, wherein said common body unit is a separate unit from said remote control transmitter and is connected in common to the plurality of equipments.

* * * * *